April 22, 1924.
L. J. McKONE
1,491,155
CONNECTING ROD AND WRIST PIN FOR ENGINES
Filed Jan. 26, 1923   3 Sheets-Sheet 1
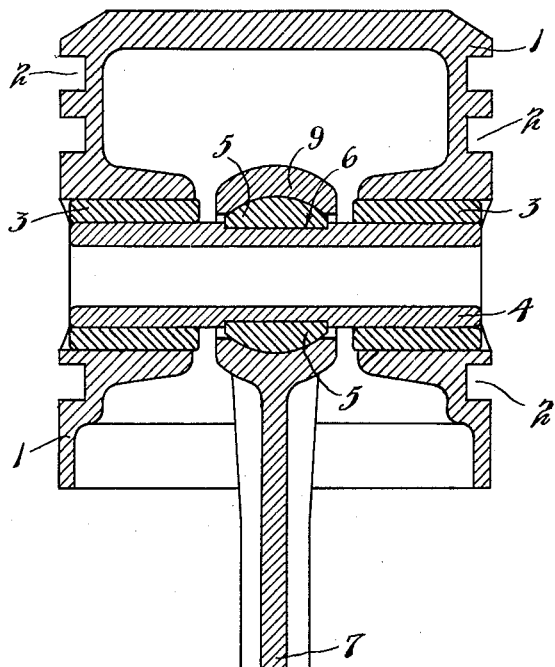
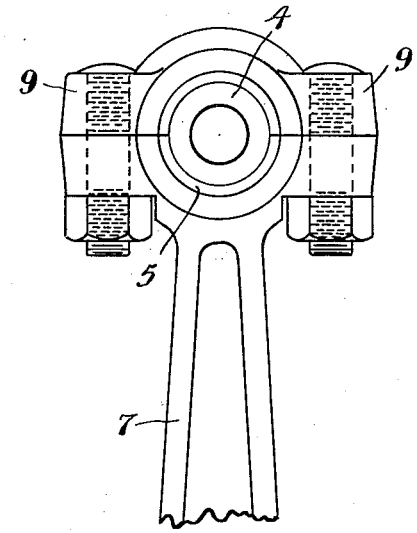
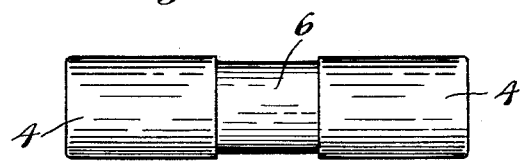
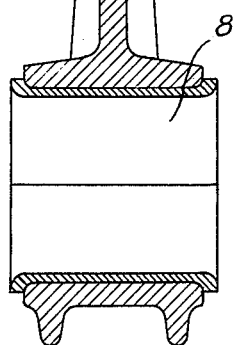
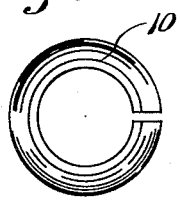
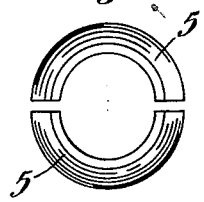
INVENTOR
LEO J. McKONE.
BY
James F. Williamson
ATTORNEY April 22, 1924.
L. J. McKONE
1,491,155
CONNECTING ROD AND WRIST PIN FOR ENGINES
Filed Jan. 26, 1923    3 Sheets-Sheet 2
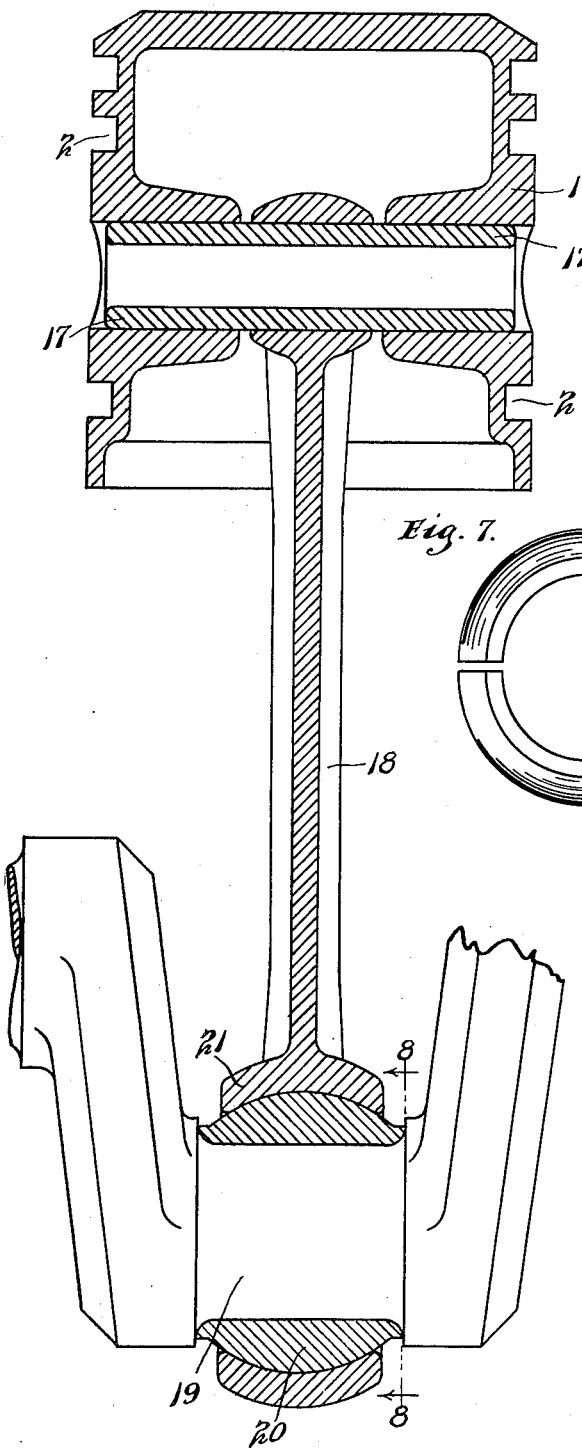
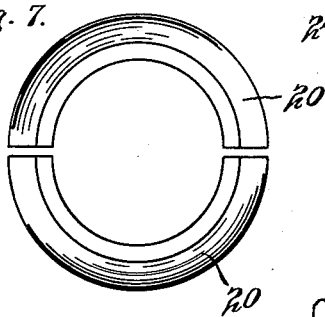
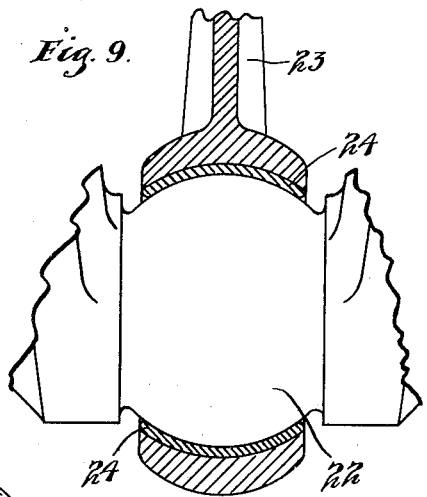
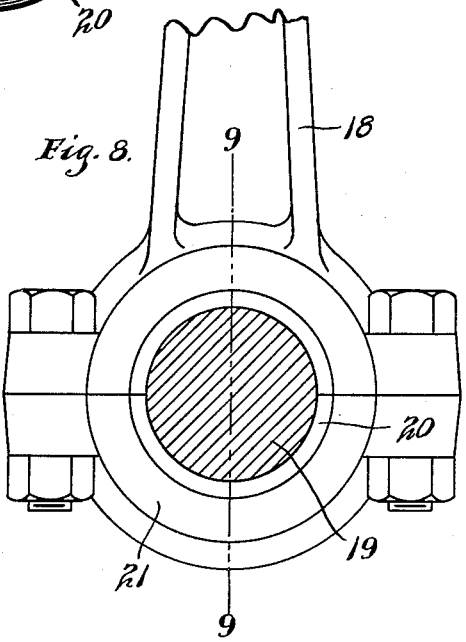
INVENTOR
LEO J. McKONE.
BY James F. Williamson
ATTORNEY April 22, 1924.
L. J. McKONE
1,491,155
CONNECTING ROD AND WRIST PIN FOR ENGINES
Filed Jan. 26, 1923    3 Sheets-Sheet 3
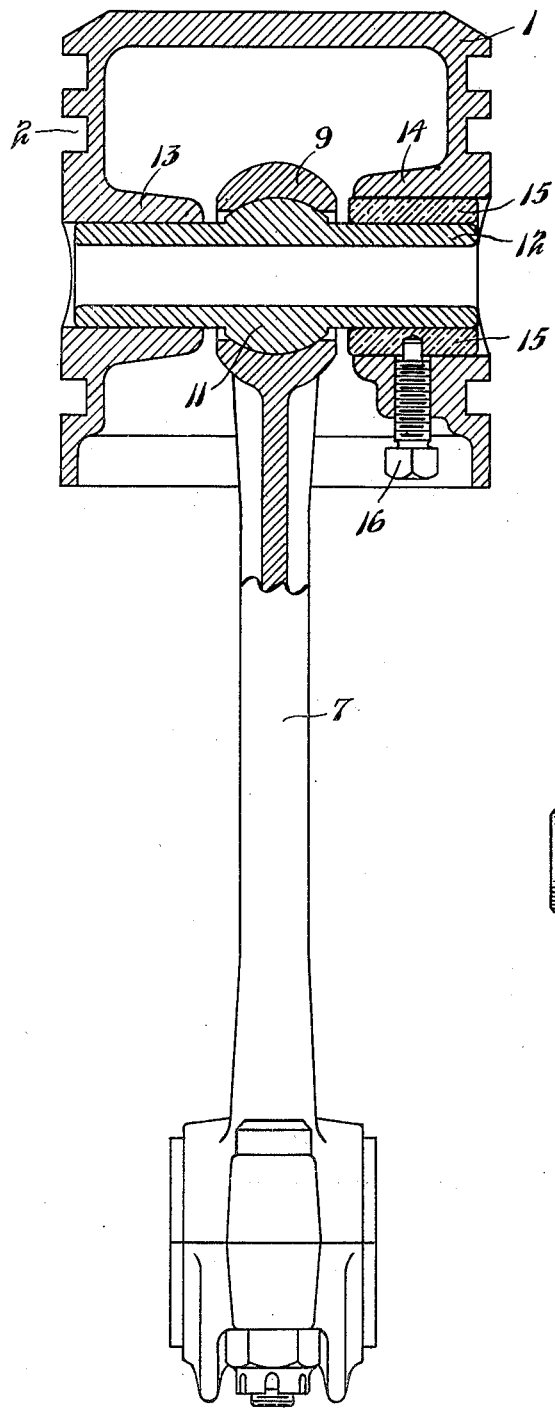
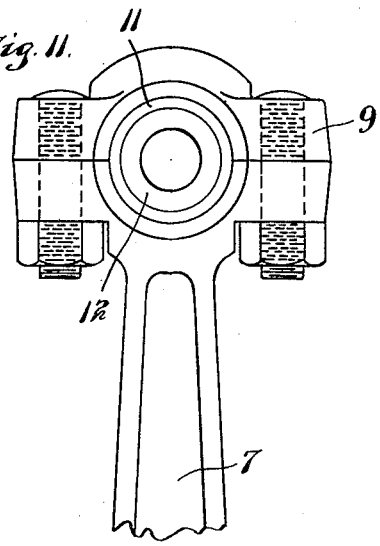
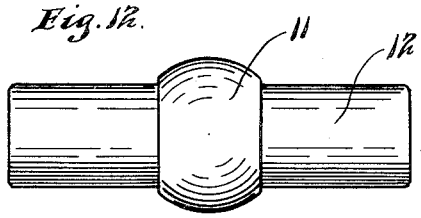
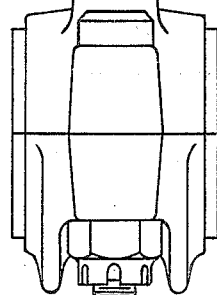
INVENTOR
LEO J. McKONE.
BY
James F. Williamson
ATTORNEY Patented Apr. 22, 1924.

1,491,155

UNITED STATES PATENT OFFICE.

LEO J. McKONE, OF MINNEAPOLIS, MINNESOTA.

CONNECTING ROD AND WRIST PIN FOR ENGINES.

Application filed January 26, 1923. Serial No. 615,003.

*To all whom it may concern:*

Be it known that I, LEO J. McKONE, a citizen of the United States, residing at Minneapolis, in the county of Hennepin and State of Minnesota, have invented certain new and useful Improvements in Connecting Rods and Wrist Pins for Engines; and I do hereby declare the following to be a full, clear, and exact description of the invention, such as will enable others skilled in the art to which it appertains to make and use the same.

This invention relates to an internal combustion engine, especially to such an engine of the automobile or aeroplane type and is particularly directed to the wrist pin and connecting rod structure in such an engine. It is well known to those skilled in the art that, theoretically, the axes of the wrist pin and crank shaft bearings should be exactly perpendicular to the axis of the cylinder bore. It is also well known that while such theoretical disposition is desirable it has not been possible to reach this condition in practice. In spite of the best efforts it is a common thing in engines of the type mentioned that the axis of the wrist pin is not exactly perpendicular to the axis of the piston or cylinder bore. This condition causes the connecting rod axis to be thrown out of the plane passing through the axis of the piston and cylinder and which is perpendicular to the axis of the crank shaft. The connecting rod thus tends to cant the piston and the piston bears more strongly against the wall of the cylinder on one side, thus resulting in an unequal wear on the piston and in scoring and scratching. It also is a frequent occurrence that the crank shaft bearing has its axis out of normal to the cylinder axis so that when the cylindrical bearing is used thereon the connecting rod, likewise, has a tendency to be moved sidewise. It will be apparent that a very small variation in the angle of the wrist pin or crank shaft axis will be greatly magnified at the other end of the connecting rod when cylindrical bearings are used in the ends of the connecting rod.

The pistons are often slightly canted so as to bear unevenly on the cylinder walls through the unequal expansion thereof and there is often enough movement between the walls of the piston and cylinder for the connecting rod to rock the piston slightly when it reverses its stroke. This results in what is generally known as "piston slap" and is a result of mal-alinement of the cylinder, piston and connecting rod. Such piston and cylinder troubles are now very numerous in automobiles and so affect the cylinders and pistons that refitting of the pistons and reboring of the cylinders is a common occurrence. This attempt to remedy the trouble is even uneffective owing to the fact that when the parts are so refitted the mal-alinement is still present.

It is an object of this invention, therefore, to provide a piston connecting rod and wrist pin or crank shaft structure which will permit of a slight lateral movement of the connecting rod without moving the piston so that the piston can still move in even contact with the cylinder.

It is another object of the invention to provide a piston having a wrist pin journaled therein and carrying intermediate its ends a semi-spherical bearing over which fits the connecting rod.

It is more specifically an object of the invention to provide such a semi-spherical bearing comprising a divided ring which is forced onto the wrist pin, preferably in the reduced portion thereof.

These and other objects and advantages of the invention will be fully set forth in the following description made in connection with the drawings in which like characters refer to the same parts throughout the different views, and in which, Fig. 1 is a vertical section through a piston and connecting rod embodying the invention;

Fig. 2 is a view in side elevation of the piston end of the connecting rod and wrist pin;

Fig. 3 is a view in side elevation of the wrist pin;

Figs. 4 and 5 are views in side elevation of the forms of bearing used with the wrist pin;

Fig. 6 is a vertical section through the piston, connecting rod and portion of the crank shaft of a modified form of the invention;

Fig. 7 is a view in side elevation of the crank shaft bearing used in the structure shown in Fig. 6;

Fig. 8 is a vertical section taken substantially on the line 8—8 of Fig. 6;

Fig. 9 is a vertical section such as taken on the line 9—9 of Fig. 8 showing a modification;

Fig. 10 is a view in vertical section through the piston and the upper end of the connecting rod, the lower end of the latter being shown in elevation, said view showing a modified form of the invention;

Fig. 11 is a view in side elevation of the upper end of the connecting rod and wrist pin; and Fig. 12 is a view in side elevation of the wrist pin used in the structure shown in Fig. 10.

Referring to the drawings, particularly Figs. 1 to 4, the piston 1 is shown of ordinary construction having therein the ring grooves 2 and which is provided with bosses bored to receive the bushings 3. A wrist pin 4 of substantially cylindrical form is journaled in the bushings 3. The wrist pin 4 has pressed thereon intermediate its ends and substantially centrally thereof, rings 5, which preferably are fitted in a reduced portion 6 formed in the center of the pin 4 and said members 5 co-operate to form a semi-spherical bearing, as clearly shown by the section therethrough in Fig. 1. A connecting rod is provided having a bushed lower end 8 adapted to fit over the crank shaft and provided at its upper end with a cap bearing having a cap 9 thereon bolted to said end in the usual manner by suitable headed and nutted bolts. The upper end of the connecting rod clearly shown in Fig. 1 is provided with a semi-spherical bearing fitting over the bearing 5. With this structure it is seen that the rod 7 may have a slight rocking movement in relation to the piston.

The semi-spherical bearing on the wrist pin may be formed of one split ring 10, as shown in Fig. 5, if desired, instead of two pieces shown in Fig. 4.

Instead of forming the semi-spherical bearing on the wrist pin of divided annular members, the same can be turned on the wrist pin integral therewith, as shown by the bearing portion 11 on the wrist pin 12 in Fig. 10. The piston 1 and connecting rod 7 shown in this figure are the same as those shown in Fig. 1. One boss or hub 13 of the piston is also similar to the hub shown in Fig. 1, but the other boss or hub 14 is of larger diameter and provided with a bore of sufficient diameter to permit the insertion therethrough of the pin 12 with the bearing 11 thereon. A bushing 15 is then fitted in the bore of hub 14 and this bushing is held in position by a set screw 16 having a reduced stem portion at one end fitting into an aperture in said bushing. It is desired to hold the bushing 15 by a set screw rather than by a driving fit, as in assembling the parts when fitted with a driving fit sufficient force might be necessary to drive out the bushing to distort the piston and cause the same to take an out-of-round shape.

In assembling the device described, the wrist pin is inserted into the piston from one side thereof and when the divided bearing shown in Figs. 4 and 5 are used, these are placed around the pin either during its insertion or afterwards and then pressed in place on the wrist pin. The connecting rod 7 is now placed in the piston with the cap thereon detached, said cap and connecting rod are then placed in embracing position relative to the semi-spherical bearing and the nuts on the bolts connecting the cap and rod turned into securing position.

In the structure shown in Figs. 6 to 9, a semi-spherical bearing is provided on the crank shaft instead of on the wrist pin. In Fig. 6 is shown the usual piston 1 having therein a wrist pin 17 to which is connected in the usual manner a connecting rod 18. The end of the connecting rod bearing on the wrist pin has the usual cylindrical bearing thereon. A crank shaft bearing 19, however, has pressed thereon a divided annular member 20 forming a semi-spherical bearing and the end of the connecting rod fitting over the crank shaft together with its cap member 21 is also provided with a semi-spherical bearing fitting over the member 20. It will thus be seen that a slight swinging movement of the connecting rod is permitted about the bearing formed by the members 20 and that the piston 1 can aline itself with the cylinder walls even if the parts are not in correct theoretical relation.

Instead of forming the cylindrical bearing on the crank shaft or divided member, as shown in Figs. 6 and 7, said shaft may have a semi-spherical portion 22 formed integral therewith and the connecting rod 23 connected thereto will be also provided with a semi-spherical bearing.

With this arrangement, a bushing 24 is preferably used in the connecting rod. The operation of the device illustrated in Fig. 9 is the same as that described in the structure shown in Figs. 6 and 7.

With such structures as described, it is apparent that the piston is free to move in the cylinder bore even if the alinement of the cylinder, piston and connecting rod is not perfect. The connecting rod has a small lateral movement relatively to the piston and will not tend to cant the same to cause one side thereof to bear more heavily against the cylinder wall. The piston is thus free to aline itself with the cylinder and any mal-alinement will not result in objectionable action on the piston and cylinder or the bearings of the wrist pin and crank shaft. The mal-alinement of the parts will thus be taken care of whether such incorrect alinement results from the initial assembling or is due to expansion or wear on the parts. The life of the piston and cylinder are thus greatly prolonged and much better action of the engine secured.

From the above description it is seen that applicant has provided an internal combustion engine structure which results in a great reduction of cylinder and piston trouble and which greatly prolongs the life of the pistons and cylinders and gives improved operation of these parts. The desired relation between the wrist pin and piston is still maintained in the cylindrical bearings at the ends of the pin and at the same time the connecting rod has sufficient leeway to move out of the plane passing through the cylinder axis and normal to the wrist pin without disadvantageously influencing the piston. The invention can be inexpensively made and adds practically nothing to the present cost of such parts. The wrist pin structure is, in fact, much simpler than many structures of the prior art operating less efficiently than the present invention. The device of the invention has been actually made and found very successful and efficient.

It will, of course, be understood, that various changes may be made in the form, details, arrangement and proportions of the parts without departing from the scope of applicant's invention, which, generally stated, consists in the matter shown and described and set forth in the appended claims.

What is claimed is:

1. In combination with an engine cylinder, a piston adapted to move therein, a wrist pin journaled therein, a semi-spherical bearing intermediate the ends of said wrist pin, and a connecting rod having a semi-spherical bearing fitting over said bearing whereby lateral swinging movement of said connecting rod is permitted.

2. The structure set forth in claim 1, said semi-spherical bearing on the wrist pin comprising a divided ring pressed on said pin.

3. The structure set forth in claim 2, said wrist pin having a reduced portion receiving said ring.

In testimony whereof I affix my signature.

LEO J. McKONE.